Jan. 13, 1953  D. G. SCHIEMAN  2,624,949
PRECISION GAUGE
Filed July 2, 1949

INVENTOR
DAVID G. SCHIEMAN

BY *Earl Benst*

HIS ATTORNEY

Patented Jan. 13, 1953

2,624,949

UNITED STATES PATENT OFFICE 2,624,949

PRECISION GAUGE

David G. Schieman, Dayton, Ohio

Application July 2, 1949, Serial No. 102,875

4 Claims. (Cl. 33—174)

This invention relates to improvements in precision tool gauges, and particularly to a gauge for checking the dimensions of a punch and die set, or of duplicate parts and plug gauges.

The precision gauging of the punch of a punch and die set for punching parts having an irregular periphery, or the gauging of duplicate parts with a master or model part, is long and tedious procedure when accomplished by the methods known in the prior art. The manufacturing of parts for machines such as accounting machines requires great accuracy. Many of such parts have irregular peripheries and include many surfaces which must be accurately correlated. In the usual method of gauging such elements a separate setting must be made for each surface gauged and therefore, it can readily be seen that such a procedure is a time consuming one. Applicant's device consists of a fixed follower finger and a correlated movable follower finger, for simultaneously gauging a model part and a punch, die or other element, the movable finger being connected to a dial gauge for indicating the differences between the outline of the model part and the punch to very close limits.

The object of the invention is to provide a precision gauge mechanism for checking the periphery of a punch or die, of a punch and die set, or any other elements.

Another object of the invention is to provide a precision gauging mechanism for comparing the outline of a model part with a punch or die for producing duplicate parts thereof.

A specific object of the invention is to provide a common support for a model part and a punch or die for producing duplicates of the part, whereon the part and the punch, or die, are mounted adjacent each other and a follower gauge having one finger for following the outline of the part and a second finger for following the outline of punch, or the die, to check the difference in dimensions between the part and the punch or die.

With these and incidental objects in view, the invention includes certain novel features of construction and combinations of parts, a preferred form or embodiment of which is hereinafter described with reference to the drawings which accompany and form a part of this specification.

General description

Figure 1:
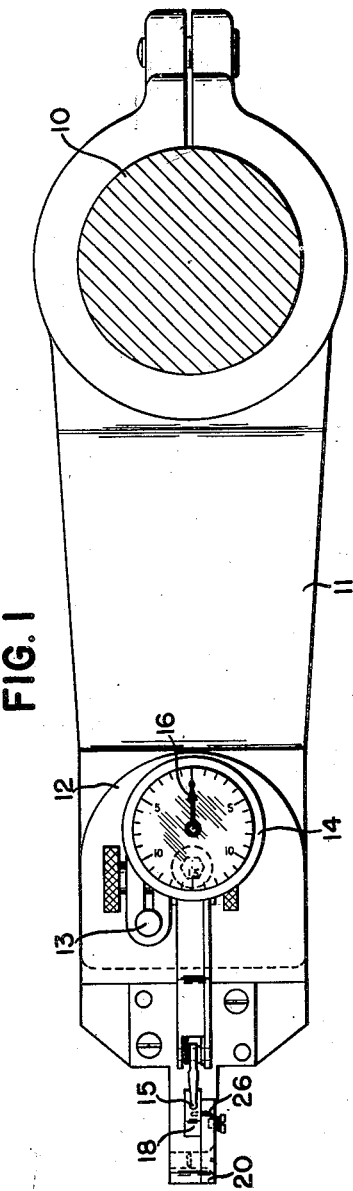
Fig. 1 is a top plan view of the punch gauge shown mounted on a standard.

In the description which follows, a punch and die set is used for illustrative purposes. It will be clear that any element to be made to the same dimensions as the model part can be gauged with the present invention with equal facility.

In making punches for precision work in producing machine parts which must be held to very close tolerances, the known methods of checking the accuracies of punches or dies having irregular shapes, consists of clamping the punch, or die, to a plate and gauging one surface at a time. A separate setting must be made for each surface to be gauged, and when gauging a punch having an irregular outline, such a method is tedious and time consuming.

In the means disclosed herein, the operation of gauging a punch or a die is simplified and requires only one setting. In processing intricate parts for precision machines, model parts are made which are assembled into a machine and the machine is then run through a thorough test to determine the accuracy of the parts and their performance. The parts of such a machine are then used as models for the mass production of the machines. The parts are made by the usual punch and die method. Applicant uses these model parts as a guide in making the punch and die sets. In gauging the accuracy of a punch, or a die, the model part and the punch, or die, are mounted adjacent each other on a fixed standard. A dial gauge, having a feeler, is mounted on a support in position with the feeler on a follower arm, so that the latter is capable of actuating the feeler. The follower arm is provided with a finger movable into engagement with the punch, or the die. Fixedly carried by support is a second follower arm mounted to engage the model part. When the point on the model part coincides with the identical point on the punch, or die, the dial indicator reads zero. Then by moving the support to cause the second follower to feel around the periphery of the model part, the first follower will operate the dial gauge and any variations in contour between the model part and the punch, or the die, can be read on the indicator of the dial gauge.

Thus by a simple operation of moving the followers around the contours of the model part and punch, or die, completes the entire checking operation which operation can be performed in a very few minutes.

Detail description

A post, or standard 10, is supported on a suitable base, which base rests on a surface plate during the gauging operation. Clamped to the standard 10, is an arm 11, on the free end of which is secured a follower arm supporting bracket 12. The bracket 12 is provided with an upstanding post 13, on which is mounted any well known dial gauge 14, such as, for example, that shown in U. S. Patent No. 1,144,367, issued to H. A. Lowe on June 29, 1915. As illustrated in Lowe, the dial gauge 14 is provided with a feeler 15 for actuating a hand 16 of the gauge 14.

The feeler 15 rests on a cam edge 17, of a first follower 18, pivotally mounted on a stud 19, the stud being mounted on a removable section 20, of the bracket 12. The pivoted follower 18 is spring urged by a spring 26 to press a feeler finger 21 thereon against the edge of a punch 22 (shown in chain lines) mounted on a suitable support 23.

Figure 2:
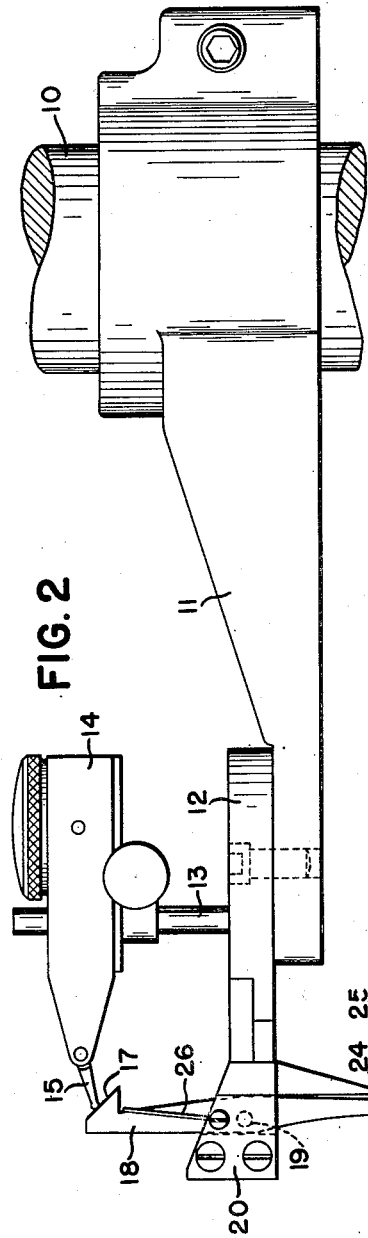
Fig. 2 is a side elevation view of the punch gauge and showing the model part and the punch being gauged in chain lines.
Figure 3:
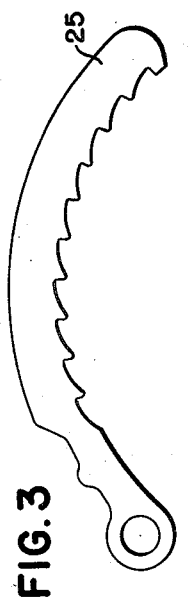
Fig. 3 is a detail view of a typical model part with which the gauge is intended to be used.

Formed on the removable section 20 is a downwardly extending second follower 24, which is moved into engagement with a model part 25 (shown in chain lines in Fig. 2, and in full lines in Fig. 3).

The model part 25 shown in Fig. 3 is an example of a part to be made by the punch being gauged, and illustrates the irregular shapes of punches to be gauged.

Operation

In operation, the punch 22, illustrated herein, and the model part 25, are mounted on the support 23, one above the other. The follower 24 is then brought into engagement with the model part 25, which brings the finger 21 into engagement with the punch 22. When the working surfaces of the fingers 21 and 24 are in alinement, the indicator hand 16 reads "0". After the followers 21 and 24 are in engagement with their respective elements the post 10 is moved to cause the followers to follow the contours of the model part. Any deviation between the outline dimensions of the two elements causes the follower 18 to move either clockwise or counter-clockwise around the pivot stud 19. The cam face 17 controls the movement of the feeler 15 to indicate the extent of deviation on the dial, either in plus or minus value. The feeler 15 is controlled by the cam face 17 since, as is described in the above named patent, the feeler is spring actuated in one direction to follow the cam face 17 and is positively moved by the cam face 17 in the other direction.

While the form of mechanism herein shown and described is admirably adapted to fulfill the objects primarily stated, it is to be understood that it is not intended to confine the invention to the one form or embodiment herein disclosed, for it is susceptible of embodiment in various other forms.

What is claimed is:

1. In a device of the class described, the combination of a dial indicator having a spring actuated feeling finger to actuate the dial indicator; a portable standard; a support adjustably mounted on the portable standard to enable the support to be positioned at any selected position thereon, said support comprising an arm extending at right angles to the portable standard; a follower pivoted intermediate its ends on the free end of said arm, said follower having one end thereof contacting with the feeling finger of the dial indicator; a gauging surface on the pivoted follower formed on the end opposite said one end, said gauging surface extending below the arm; a stationary follower on said arm and extending below said arm adjacent said pivoted follower, said stationary follower having a gauging surface immediately adjacent the gauging surface of the pivoted follower and adapted to be engaged with a model part by moving the portable standard to guide the gauging surface of the pivoted follower around the contour of an element to be gauged, said pivoted follower acting to actuate the indicator to indicate differences in contour of the element as compared with the model part, and a common support for the model part and the element to be gauged, said model part and said element being located on the support in contact with each other with their contours in alined relationship with each other and in alinement with the respective gauging surfaces.

2. In a device according to claim 1 in which the pivoted follower is spring actuated in one direction and positively actuated in the other direction by the contour of the element being gauged.

3. In a device according to claim 1 in which the support for the model part and the element to be gauged, and the support for the follower are independently mounted to permit relative movements therebetween.

4. In a device according to claim 1 in which the followers are mounted on a support which is movable in relation to the element to be gauged and the model part.

DAVID G. SCHIEMAN.

REFERENCES CITED

The following references are of record in the file of this patent:

UNITED STATES PATENTS

| Number | Name | Date |
|---|---|---|
| 1,073,089 | Bowers | Sept. 16, 1913 |
| 1,144,367 | Lowe | June 29, 1915 |
| 1,259,196 | Ames | Mar. 12, 1918 |
| 1,351,663 | Koch | Aug. 31, 1920 |
| 1,652,435 | Goodrich | Dec. 13, 1927 |
| 1,840,538 | Simmons | Jan. 12, 1932 |
| 2,396,383 | Moore | Mar. 12, 1946 |
| 2,425,381 | Lovick | Aug. 12, 1947 |
| 2,427,152 | Moore | Sept. 9, 1947 |
| 2,480,891 | Von Winkle | Sept. 6, 1949 |

OTHER REFERENCES

American Machinist, page 745, Nov. 8, 1928.